(12) United States Patent
Abe et al.

(10) Patent No.: US 9,971,475 B2
(45) Date of Patent: May 15, 2018

(54) ELECTRONIC APPARATUS

(71) Applicants: PIONEER CORPORATION, Kawasaki-shi, Kanagawa (JP); TOHOKU PIONEER CORPORATION, Tendo-shi, Yamagata (JP)

(72) Inventors: Makoto Abe, Tendo (JP); Koji Sasahara, Tendo (JP); Takeru Miki, Tendo (JP)

(73) Assignees: PIONEER CORPORATION, Kawasaki-Shi, Kanagawa (JP); TOHOKU PIONEER CORPORATION, Thedo-Shi, Yamagata (JP)

( * ) Notice: Subject to any disclaimer, the term of this patent is extended or adjusted under 35 U.S.C. 154(b) by 0 days. days.

(21) Appl. No.: 14/649,588

(22) PCT Filed: Dec. 6, 2012

(86) PCT No.: PCT/JP2012/081668
§ 371 (c)(1),
(2) Date: Jun. 4, 2015

(87) PCT Pub. No.: WO2014/087523
PCT Pub. Date: Jun. 12, 2014

(65) Prior Publication Data
US 2015/0317044 A1    Nov. 5, 2015

(51) Int. Cl.
*G09G 5/00* (2006.01)
*G06F 3/0482* (2013.01)
(Continued)

(52) U.S. Cl.
CPC .......... *G06F 3/0482* (2013.01); *G01C 21/26* (2013.01); *G01C 21/365* (2013.01);
(Continued)

(58) Field of Classification Search
None
See application file for complete search history.

(56) References Cited

U.S. PATENT DOCUMENTS

| | | | | |
|---|---|---|---|---|
| 5,638,279 A * | 6/1997 | Kishi | ................. | G01C 21/3632 340/990 |
| 7,869,938 B2 * | 1/2011 | Wako | ................... | G01C 21/367 345/421 |

(Continued)

FOREIGN PATENT DOCUMENTS

| | | |
|---|---|---|
| JP | 6-67604 A | 3/1994 |
| JP | 2009-98086 A | 5/2009 |

(Continued)

OTHER PUBLICATIONS

International Search Report of PCT/JP2012/081668, dated Feb. 26, 2013. [PCT/ISA/210].

*Primary Examiner* — Peter Hoang
(74) *Attorney, Agent, or Firm* — Sughrue Mion, PLLC

(57) ABSTRACT

To provide an electronic apparatus capable of easily and accurately performing an operation of changing a display. A navigation system displays standard map information in small scale on a liquid crystal display device, and displays status information on movement speed of a vehicle or guidance information on distance and direction to a cross point to turn next on a head-up display device. Only while a contact of a contact body on a surface of a touchpad continues to be detected, first scaled-up map information as the scaled-up standard map information continues to be displayed on the liquid crystal display device instead of the standard map information.

7 Claims, 11 Drawing Sheets

(51) Int. Cl.
*G06F 3/041* (2006.01)
*G06F 1/16* (2006.01)
*G09G 3/36* (2006.01)
*G02B 27/01* (2006.01)
*G01C 21/26* (2006.01)
*G01C 21/36* (2006.01)
*G09B 29/10* (2006.01)

(52) U.S. Cl.
CPC ....... *G01C 21/367* (2013.01); *G01C 21/3664* (2013.01); *G02B 27/01* (2013.01); *G06F 1/1671* (2013.01); *G06F 3/0412* (2013.01); *G06F 3/0414* (2013.01); *G09B 29/106* (2013.01); *G09G 3/36* (2013.01); *G06F 2203/04101* (2013.01); *G06F 2203/04105* (2013.01); *G06F 2203/04806* (2013.01); *G06F 2203/04808* (2013.01); *G06F 2212/173* (2013.01)

(56) References Cited

U.S. PATENT DOCUMENTS

| | | | | |
|---|---|---|---|---|
| 2007/0097151 | A1* | 5/2007 | Rosenberg | G06F 1/1626 345/660 |
| 2008/0122799 | A1* | 5/2008 | Pryor | G06F 3/0312 345/173 |
| 2010/0031169 | A1* | 2/2010 | Jang | G06F 1/1624 715/760 |
| 2011/0145863 | A1* | 6/2011 | Alsina | G06F 9/4445 725/44 |
| 2011/0224897 | A1* | 9/2011 | Tan | G01C 21/3664 701/532 |
| 2013/0091467 | A1* | 4/2013 | Pallakoff | G06F 3/0482 715/835 |

FOREIGN PATENT DOCUMENTS

| | | |
|---|---|---|
| JP | 2012-173686 A | 9/2012 |
| WO | 2011/092746 A1 | 8/2011 |

* cited by examiner

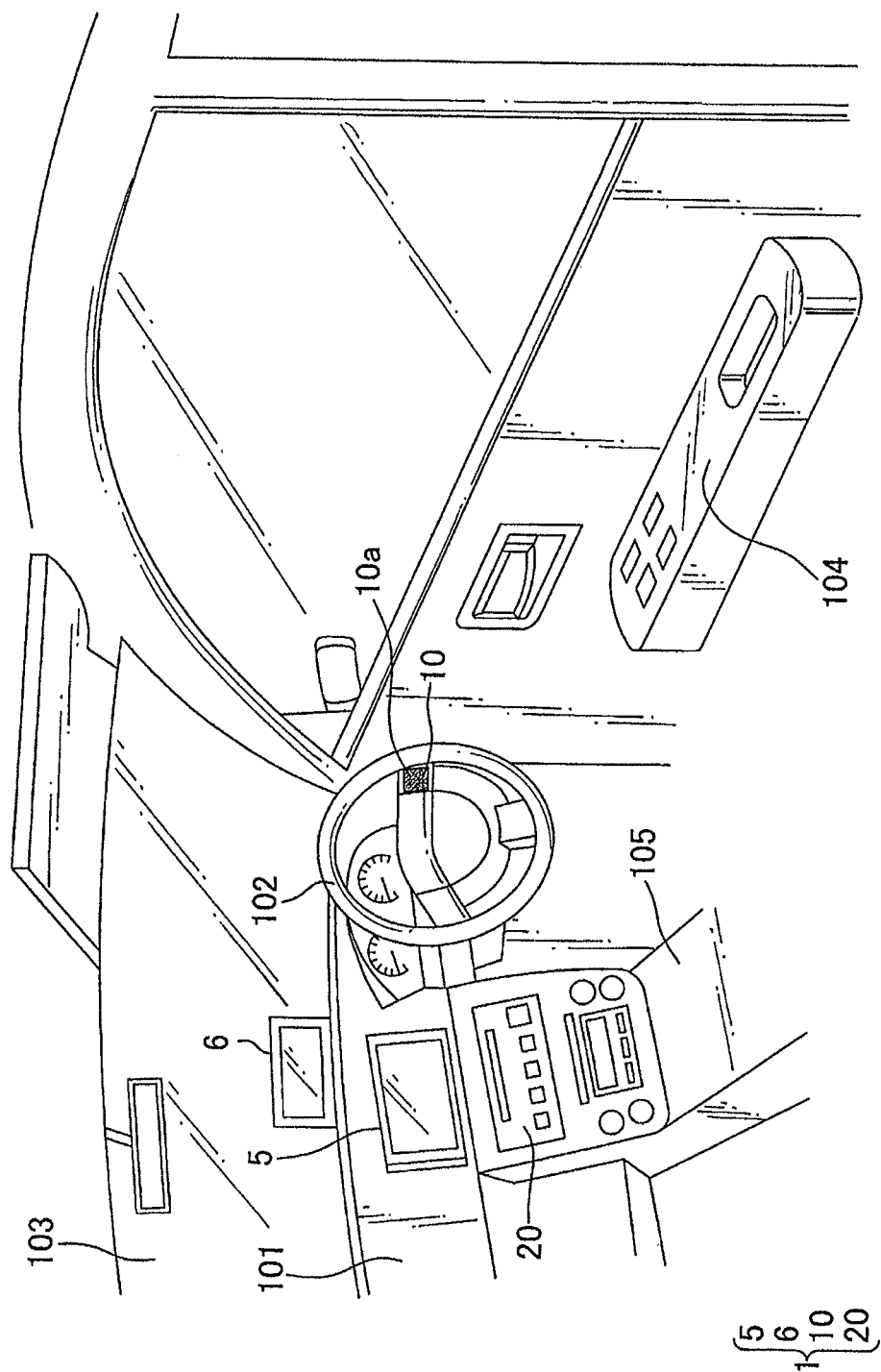

ELECTRONIC APPARATUS

CROSS REFERENCE TO RELATED APPLICATIONS

This application is a National Stage of International Application No. PCT/JP2012/081668 filed Dec. 6, 2012, the contents of all of which are incorporated herein by reference in their entirety.

TECHNICAL FIELD

The present invention relates to an electronic apparatus including a display unit.

BACKGROUND ART

Conventionally, in a vehicle-mounted navigation system or the like as an electronic apparatus, a vehicle pointer indicating a current location of the vehicle mounting the same, map information on road shapes, map-related information such as icons or characters indicating buildings or facilities, and guidance information such as guidance routes from a current location to a destination location are displayed on a display unit such as liquid crystal display.

For example, Patent Literature 1 discloses therein a navigation system in which a touch panel is arranged on the display screen of a display device. In the navigation system, the vehicle pointer, the map information, the map-related information and the guidance information are displayed on the display device, and additionally a scale-up button and a scale-down button for changing a map scale as well as a menu button for calling various menus are displayed.

Each time a portion overlapping on the scale-up button on the touch panel (which will be simply called "scale-up button" below) is pressed by a finger or the like, the navigation system stepwise scales up and displays the map information. Similarly, each time a portion overlapping on the scale-down button on the touch panel (which will be simply called "scale-down button" below) is pressed by a finger or the like, the map information is stepwise scaled down and displayed. The user of the navigation system presses the scale-up button and the scale-down button thereby to change the scale for easy viewing of the map information.

CITATION LIST

Patent Literature

Patent Literature 1: JP 2012-173686 A

SUMMARY OF INVENTION

Technical Problem

However, in the navigation system, for example, when the user wants to temporarily scale up and display the map information, he/she presses the scale-up button once or more times to scale up the map information, and then needs to scale down the map information by pressing the scale-down button in order to return the map information to the former display, and thus there is an exemplary problem on complicated operations.

Further, the driver operates the scale-up button and the scale-down button without visual contact while facing forward, and thus there is an exemplary problem of erroneous pressing of the buttons.

It is therefore an object of the present invention to provide an electronic apparatus capable of easily performing an operation of changing a display.

Solution to Problem

In order to solve the above problems, the invention according to a first aspect is an electronic apparatus including a display unit and an operation input unit, wherein the operation input unit includes a contact surface, and only while a contact of a contact body on the contact surface continues to be detected, predetermined information continues to be displayed on the display unit.

BRIEF DESCRIPTION OF DRAWINGS

FIG. 15 is a perspective view schematically illustrating other example of the interior of the vehicle on which the navigation system according to an embodiment of the present invention is mounted.

DESCRIPTION OF EMBODIMENTS

Figure 1:
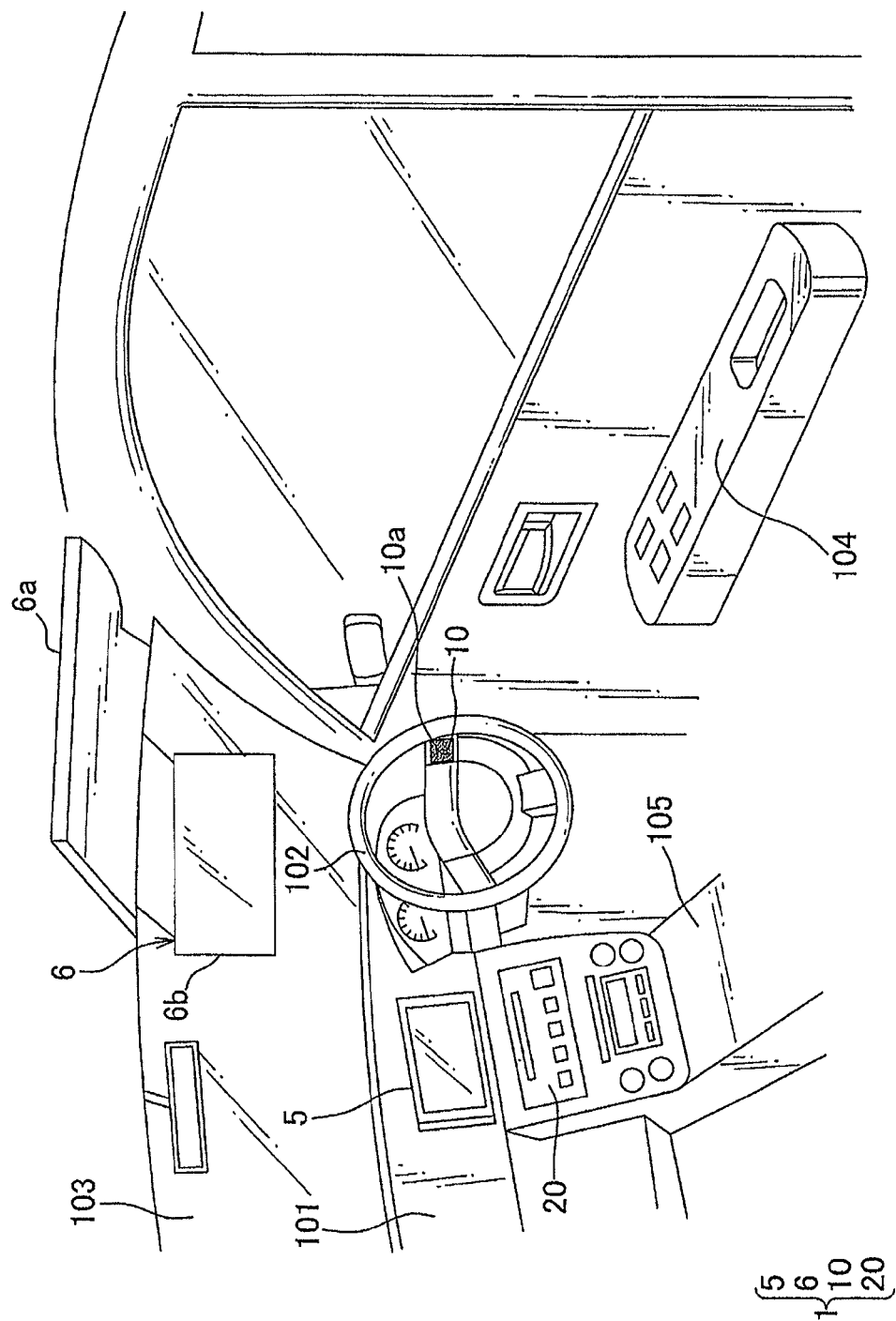
FIG. 1 is a perspective view schematically illustrating an example of the interior of a vehicle on which a navigation system according to a first embodiment of the present invention is mounted.

An electronic apparatus according to one embodiment of the present invention will be described below. The electronic apparatus according to one embodiment of the present invention displays various items of information on one or more display units. When a user inputs an operation, the contact surface of an operation input unit is contacted by a contact body such as a finger of the user or a stylus pen. A display control unit displays various items of information on the display units. Only while a contact of the contact body on the contact surface continues to be detected, predetermined information continues to be displayed on the display unit. Further, the predetermined information is different from information already displayed on the display unit. Further, the predetermined information is displayed on the display unit instead of the information already displayed on the display unit or together with the information already displayed on the display unit. When the user contacts the contact body such as a finger on the contact surface of the operation input unit while information continues to be displayed on the display unit, predetermined information is displayed instead of information displayed on the display unit or together with the information while the contact on the contact surface continues to be detected by the electronic apparatus, and when the contact body is released from (not contacted with) the contact surface, the predetermined information is not displayed. Therefore, the operation of changing a display can be easily and accurately performed. The electronic apparatus includes a contact detection unit for detecting the presence or absence of a contact of the contact body on the contact surface. The contact detection unit detects the presence or absence of a contact of the contact body on the contact surface of the operation input unit.

The contact detection unit may be configured to contact the presence or absence of a contact of the contact body based on a pressing force applied on the contact surface. By doing so, the presence or absence of a contact on the contact surface is detected by a force (pressing force) with which the user presses the contact body against the contact surface, and thus the user presses the contact body against the contact surface with a relatively strong force. Thereby, an erroneous operation can be prevented and a feeling of operation can be given to the user thereby to easily and more accurately perform the operation of changing a display. Additionally, the contact detection unit may detect only the presence of a contact or the absence of a contact.

Further, there may be configured such that the contact surface displaces in a direction in which the contact surface is passed through and the contact detection unit detects the presence or absence of a contact of the contact body based on the amount of displacement of the contact surface. By doing so, the contact surface displaces and sinks according to the pressing force so that the user can feel a reaction to the operation (displacement of the contact surface). Thereby, an erroneous operation can be prevented and a feeling of operation can be given to the user thereby to easily and more accurately perform the operation of changing a display.

Further, there may be configured such that the information already displayed on the display unit is map information and the predetermined information is scaled-up map information of the map information or map-related information related to the map information. By doing so, for example, when the user contacts the contact body such as a finger on the contact surface of the operation input unit while map information on road shapes continues to be displayed on the display unit, scaled-up map information of the map information or map-related information on buildings or facilities related to the map information is displayed instead of the map information or in addition to the map information while the contact on the contact surface is kept, and then the contact body is released from (not contacted with) the contact surface thereby to return the display to the map information. Therefore, the operation of changing a display can be easily and accurately performed.

Further, there may be configured such that the information already displayed on the display unit is at least one item of information selected from a group consisting of map-related information on the vicinity of a current location, map information on the vicinity of a current location, guidance information to a destination location, and predetermined status information and the predetermined information is map-related information on the vicinities of locations away from a current location by a predetermined distance. By doing so, for example, when the user contacts the contact body such as a finger on the contact surface of the operation input unit while the display unit is displaying thereon map information on road shapes, map-related information on buildings or facilities around a current location, guidance information on a route to a destination location and a distance or direction to a cross point to turn next, or predetermined status information on movement speed or the like (which will be simply called "display information" below), the map-related information on the vicinities of locations away from a current location by a predetermined distance is displayed instead of the display information or in addition to the display information while the contact on the contact surface is kept, and then the contact body is released from (not contacted with) the contact surface thereby to return the display to the display information. Therefore, the operation of changing a display can be easily and accurately performed.

The operation input unit may be configured to output pressing force information depending on a pressing force applied on the contact surface, the contact detection unit may be configured to detect the presence or absence of a contact of the contact body based on the pressing force information output by the operation input unit, and the display unit may be configured to display predetermined information corresponding to a plurality of different pressing forces applied on the contact surface. By doing so, the user strengthens or weakens a pressing force of the contact body on the contact surface so that different predetermined information depending on the strengthened or weakened force can be displayed, thereby more easily and accurately performing the operation of changing a display.

Further, there may be configured such that the information already displayed on the display unit is map information and the predetermined information is scaled-up map information of the map information. By doing so, the user strengthens or weakens a pressing force of the contact body on the contact surface so that the scaled-up map information with a different scale-up rate depending on the strengthened or weakened force can be displayed, thereby more easily and accurately performing the operation of changing a display.

Further, there may be configured such that the information already displayed on the display unit is at least one item of information selected from a group consisting of map-related information on the vicinity of a current location, map information on the vicinity of a current location, guidance information to a destination location and predetermined status information, and the predetermined information is map-related information on the vicinities of locations away from a current location by a predetermined distance depending on a pressing force. By doing so, the user strengthens or weakens a pressing force of the contact body on the contact surface so that the map-related information on the vicinities of locations at a different distance depending on the strengthened or weakened force can be displayed, thereby more easily and accurately performing the operation of changing a display.

Further, the display unit and the operation input unit may be separately configured from each other. By doing so, for example, the display unit can be arranged to be easily viewed by the user and the operation input unit can be arranged at a position where the user can easily contact the contact body on the contact surface, thereby more easily and accurately performing the operation of changing a display.

Further, there may be configured such that the electronic apparatus is mounted on a vehicle and the operation input unit thereof is arranged around a seat in the vehicle, such as around the driver seat, around the passenger seat, or around the rear passenger seat. By doing so, the driver as a user can contact the contact body such as a finger on the contact surface without any trouble on the driving, thereby safely performing the operation of changing a display. Further, a passenger at the rear passenger seat can safely perform the operation of changing a display without contacting the display unit arranged on the driver seat side.

First Embodiment

A navigation system as an electronic apparatus according to a first embodiment of the present invention will be described with reference to FIGS. 1 to 6.

Figure 2:
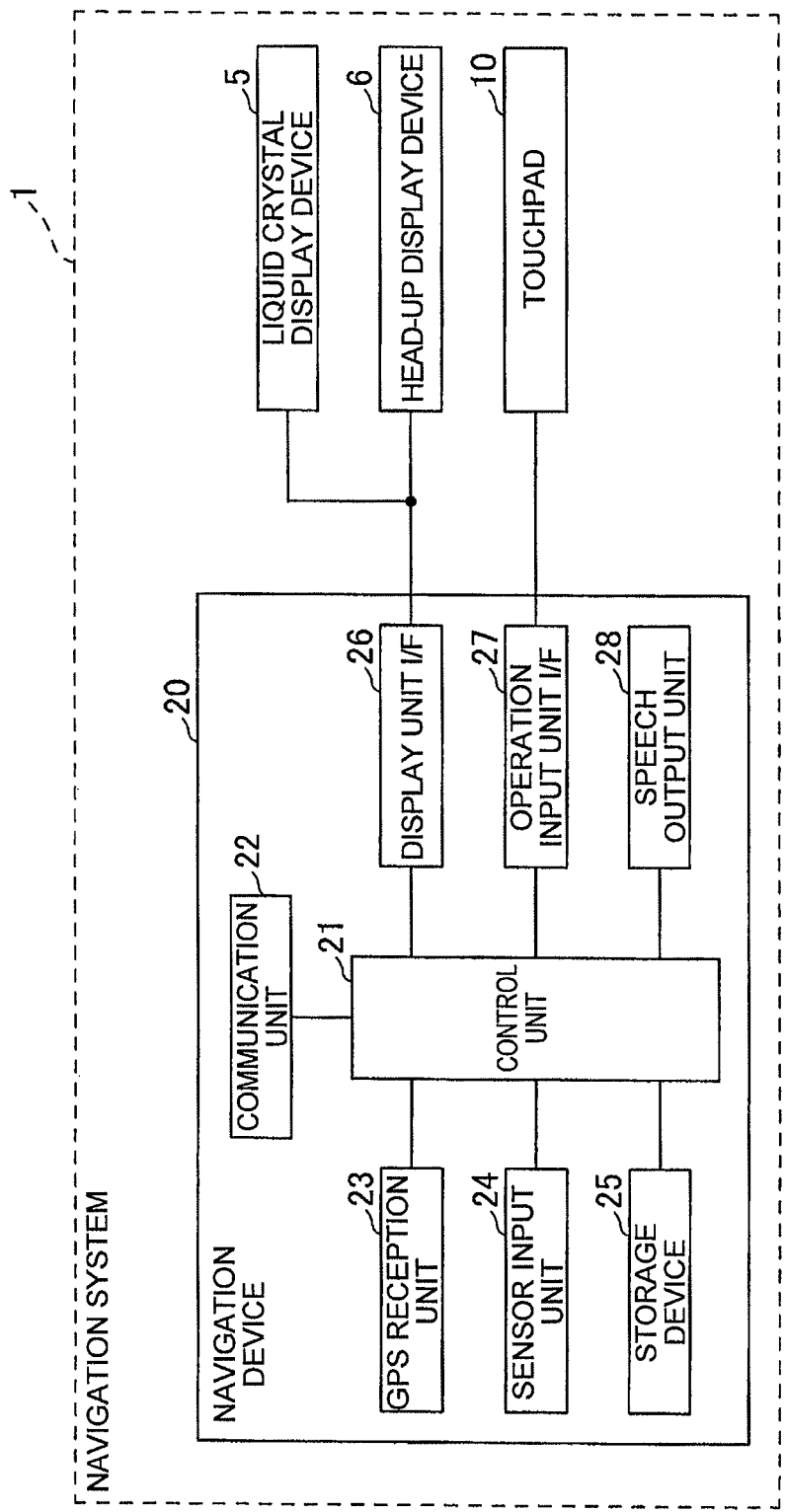
FIG. 2 is a functional block diagram of the navigation system illustrated in FIG. 1.

FIG. 1 is a perspective view schematically illustrating the interior of a vehicle on which the navigation system according to the first embodiment of the present invention is mounted. FIG. 2 is a functional block diagram of the navigation system illustrated in FIG. 1.

As illustrated in FIG. 1 and FIG. 2, the navigation system 1 separately includes a liquid crystal display device 5 attached on the top of a dashboard 101 in the vehicle, a head-up display device 6 attached almost in front of a driver, a touchpad 10 provided on a steering wheel 102, and a navigation device 20 embedded below the liquid crystal display device 5 in the dashboard 101. The displays such as the liquid crystal display device 5 and the head-up display may be attached behind the driver seat (for the rear passenger seat). The operation input unit such as touchpad 10 may be provided around the passenger seat or around the rear passenger seat other than around the driver seat.

The liquid crystal display device 5 includes a liquid crystal display unit and a touch panel unit arranged to be overlapped thereon. The liquid crystal display device 5 is connected to the navigation device 20. The liquid crystal display device 5 displays, on the liquid crystal display unit, depending on a display control signal received from the navigation device 20, map information on road shapes, map-related information such as icons and characters indicating buildings or facilities including buildings, landmarks, parks, gas stations and convenience stores, guidance information on a route to a guided point (guided route), and operation buttons. Further, when a portion overlapping on an operation button on the touch panel unit (which will be simply called "operation button" below) is pressed, the liquid crystal display device 5 transmits operation information indicating that the operation button is pressed to the navigation device 20. The liquid crystal display device 5 corresponds to an exemplary display unit.

The head-up display device 6 includes a light source unit 6a embedded on the top (ceiling) of the dashboard 101 toward a front glass 103 and directed for irradiating a light, and a combiner unit 6b provided to be attached above and in front of the driver over the front glass 103 and directed for reflecting a light irradiated from the light source unit toward the driver. The head-up display device 6 is connected to the navigation device 20. The head-up display device 6 irradiates a light from the light source unit toward the combiner unit depending on a display control signal received from the navigation device 20 thereby to overlap and display status information on movement speed of the vehicle, or a distance and direction to a cross point to turn next on the scene outside the vehicle. The head-up display device 6 corresponds to an exemplary display unit. Alternatively, as illustrated in FIG. 15, the head-up display device 6 may be arranged on the dashboard 101. The head-up display device 6 automatically comes out of the dashboard 101 upward when the vehicle is driven.

The touchpad 10 is formed in a sheet shape by use of a pressure sensitive sensor or the like, and is provided on the steering wheel 102 of the vehicle such that the driver can operate (press) it without releasing the hands from the steering wheel 102. The touchpad 10 is connected to the navigation device 20. The touchpad 10 outputs an electric signal depending on a force to press the contact body such as a finger against the surface 10a (pressing force applied on the surface 10a) to the navigation device 20. The touchpad 10 corresponds to an exemplary operation input unit and the surface 10a thereof corresponds to an exemplary contact surface. Further, an electric signal output by the touchpad 10 corresponds to exemplary pressing force information.

Figure 3:
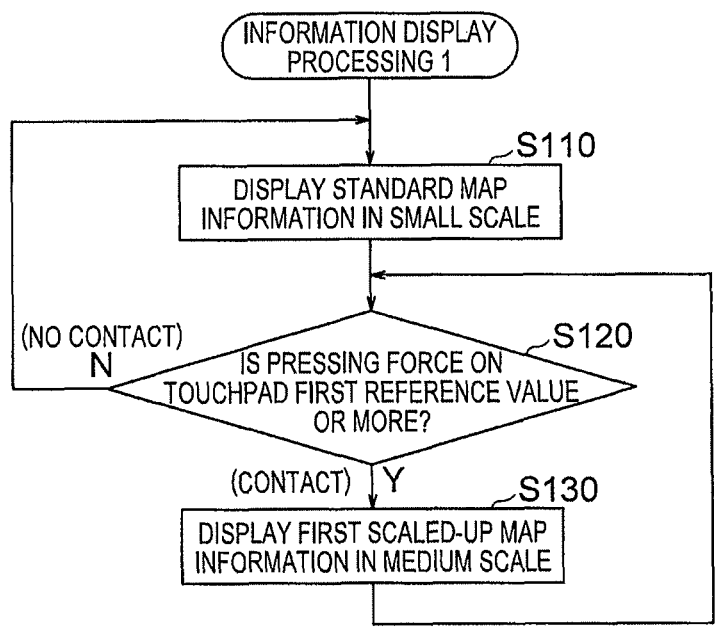
FIG. 3 is a flowchart illustrating an exemplary operation (information display processing 1) of a control unit in a navigation device illustrated in FIG. 2.

As illustrated in FIG. 3, the navigation device 20 includes a control unit 21, a communication unit 22, a GPS reception unit 23, a sensor input unit 24, a storage device 25, a display unit I/F 26, an operation input unit I/F 27, and a speech output unit 28.

The control unit 21 is configured of CPU (Central Processing Unit) including a memory such as RAM (Random Access Memory) or ROM (Read Only Memory). The control unit 21 governs the entire control of the navigation device 20, displays various items of information (such as map information, map-related information, guidance information and status information) on the liquid crystal display device 5 or the head-up display device 6, and performs an operation of searching a route (guided route) to a destination location.

The communication unit 22 makes communication with, under control of the control unit 21, a remote server via a public wireless communication line used for, for example, mobile communication thereby to transmit information on a current location thereof (the vehicle mounting the navigation device 20 thereon) to the server, and receives information on road situations around a current location, such as traffic jam. The received information is sent to the control unit 21 and displayed on the liquid crystal display device 5 or the like together with the map information. In the present embodiment, an example in which the navigation device 20 is integrally provided with the communication unit 22 is illustrated, but the communication unit 22 may be separately configured by connecting a card-shaped communication device or cell phone thereto via a cable or the like, and may be detachable from the navigation device 20.

The GPS reception unit 23 receives radio waves originated from a plurality of GPS (Global Positioning System) satellites, and finds and outputs information on a current location (current location information) to the control unit 21. In the present embodiment, an example in which the navigation device 20 is integrally provided with the GPS reception unit 23 is illustrated, but the GPS reception unit 23 may be separately configured and may be detachable from the navigation device 20. The GPS reception unit 23 is an exemplary current location acquisition unit.

The sensor input unit 24 receives sensor inputs on vehicle statuses from a vehicle speed sensor and an acceleration sensor, or inputs from a standalone sensor or the like for calculating a current location when the GPS reception unit 23 cannot calculate a current location, and outputs the same to the control unit 21. The sensor input unit 24 may not be necessarily provided.

The storage device 25 is configured of a hard disk or a nonvolatile memory, for example, and stores therein programs or data for the control unit 21 to control the navigation device 20, and map information and map-related information displayed on the liquid crystal display device 5 or the head-up display device 6, as well as search data used for searching a route to a destination location. The map information and the map-related information as well as the search data may be acquired not from the storage device 25 but from a server via the communication unit 22.

The display unit I/F 26 includes a communication function, and is communicably connected with the liquid crystal display device 5 and the head-up display device 6 via a wire harness. The display unit I/F 26 transmits a display control signal from the control unit 21 to the liquid crystal display device 5 and the head-up display device 6, and receives and passes operation information from the liquid crystal display device 5 to the control unit 21. The present embodiment assumes that the display unit I/F 26 as well as the liquid crystal display device 5 and the head-up display device 6 are communicably connected with each other by use of a wire such as wire harness, but instead they are communicably connected with each other by use of a wireless communication standard such as wireless LAN or Bluetooth (trademark).

The operation input unit I/F 27 includes an A/D conversion function, and is connected to the touchpad 10 via a wire harness, for example. When receiving an electric signal (or pressing force information) from the touchpad 10, the operation input unit I/F 27 quantifies and passes the electric signal to the control unit 21. The present embodiment assumes that the operation input unit I/F 27 and the touchpad 10 are connected with each other via a wire such as wire harness, but instead the communication functions may be mounted on the operation input unit I/F 27 and the touchpad 10, respectively, and they may be communicably connected with each other in a wired or wireless manner.

The speech output unit 28 is configured of a speaker and an amplifier or the like for driving the speaker, and outputs guidance speech, confirmation sound and the like on the operations under control of the control unit 21.

Exemplary operations of the control unit 21 in the navigation device 20 with the above structure will be described below with reference to FIG. 3 to FIG. 5.

FIG. 3 is a flowchart of an exemplary operation (information display processing 1) of the control unit in the navigation device illustrated in FIG. 2. FIG. 4 is a diagram illustrating exemplary information displayed on the liquid crystal display device illustrated in FIG. 1 (to display standard map information in small scale). FIG. 5 is a diagram illustrating other exemplary information displayed on the liquid crystal display device illustrated in FIG. 1 (to display first scaled-up map information in medium scale).

At first, in step S110 illustrated in FIG. 3, the control unit 21 acquires current location information from the GPS reception unit 23, and generates and transmits a display control signal for displaying standard map information M0 in predetermined small scale (such as 1/200,000th) indicating road shapes almost around a current location of the vehicle indicated in the current location information to the liquid crystal display devices. The display control signal includes a vehicle pointer P indicating a current location of the vehicle and guidance information G indicating a route to a destination location in addition to the standard map information M0. When receiving the display control signal, the liquid crystal display device 5 displays the standard map information M0, the vehicle pointer P and the guidance information G on the display part as illustrated in FIG. 4. The processing then proceeds to step S120. The standard map information M0 corresponds to the examples of the information already displayed on the display unit and the map information.

In step S120, the control unit 21 determines whether a pressing force indicated by the electric signal (pressing force information) received from the touchpad 10 is a first reference value previously stored in the ROM or more. When the pressing force is less than the first reference value (N in step S120), the control unit 21 returns to step S110 assuming that nothing contacts on the touchpad 10, or when the pressing force is the first reference value or more (Y in S120), the control unit 21 proceeds to step S130 assuming that the contact body such as a finger of the driver contacts on the touchpad 10.

In step S130, the control unit 21 acquires current location information from the GPS reception unit 23, and generates and transmits a display control signal for displaying first scaled-up map information M1 in predetermined medium scale (such as 1/50,000th) larger than the small scale to the liquid crystal display device 5. That is, the first scaled-up map information M1 is the scaled-up standard map information M0. The display control signal includes map-related information Rs such as icons indicating facilities including gas stations or convenience stores within the display range of the first scaled-up map information M1, the vehicle pointer P and the guidance information G in addition to the first scaled-up map information M1. When receiving the display control signal, the liquid crystal display device 5 displays the first scaled-up map information M1, the map-related information Rs, the vehicle pointer P and the guidance information G on the display part as illustrated in FIG. 5. The processing then returns to step S120. The first scaled-up map information M1 corresponds to the examples of the predetermined information and the scaled-up map information. The map-related information Rs corresponds to the examples of the predetermined information and the map-related information.

Figure 6:
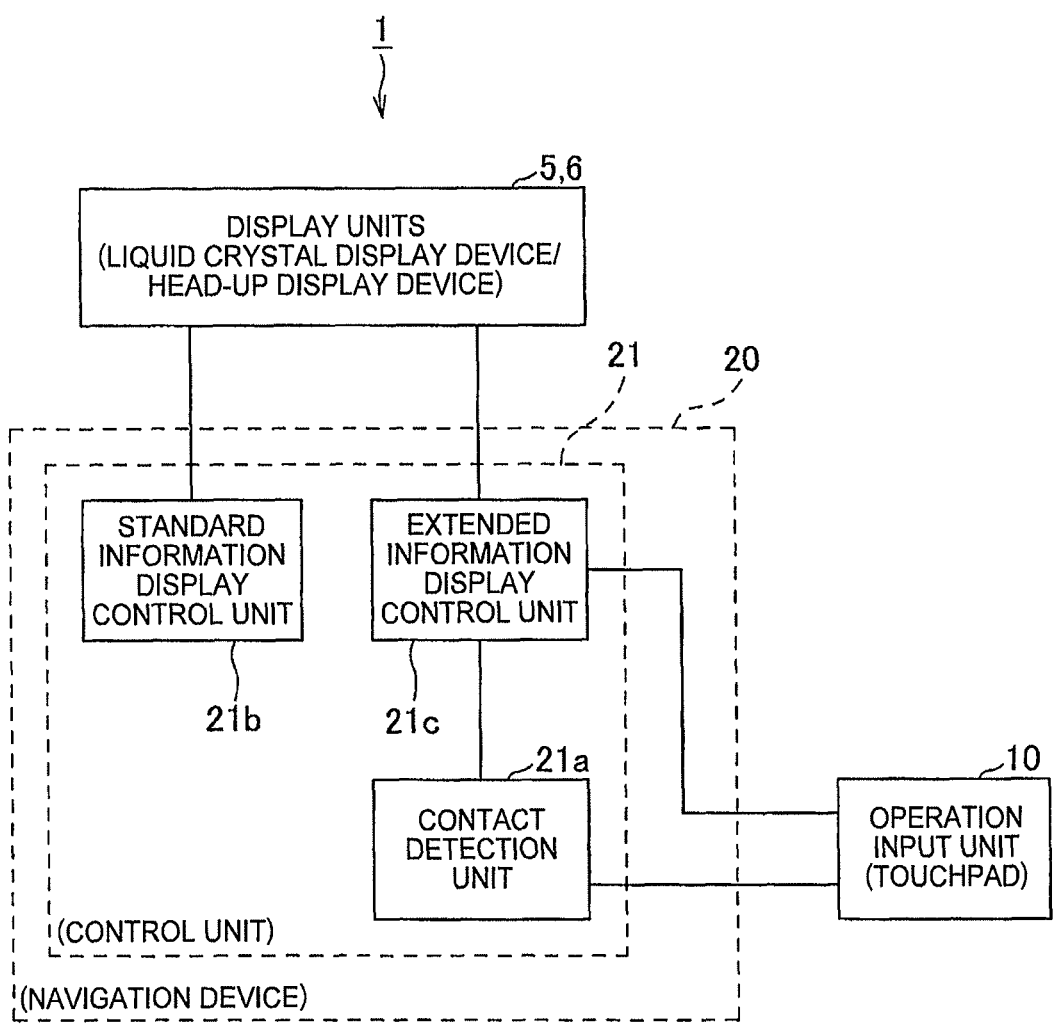
FIG. 6 is a conceptual functional block diagram of the navigation system illustrated in FIG. 1.

The control unit 21 performing the processing in step S110 corresponds to an exemplary standard information display control unit, the control unit 21 performing the processing in step S120 corresponds to an exemplary contact detection unit, and the control unit 21 performing the processing in step S130 corresponds to an exemplary extended information display control unit. FIG. 6 is a conceptual functional block diagram of the navigation system illustrated in FIG. 1.

Operations input in the navigation system 1 according to the present embodiment and displays corresponding thereto will be described herein by way of example.

When the driver inputs a search operation in the liquid crystal display device 5, the navigation device 20 searches a route to a destination location. While the driver is gripping the steering wheel 102 and a finger of the driver continues to be released from the touchpad 10 provided on the steering wheel 102 (nothing contacts on the touchpad 10), the liquid crystal display device 5 displays thereon the standard map information M0 in small scale indicating road shapes around a current location of the vehicle, the vehicle pointer P indicating a current location of the vehicle, and the guidance information G indicating a route to a destination location as illustrated in FIG. 4.

Figure 5:
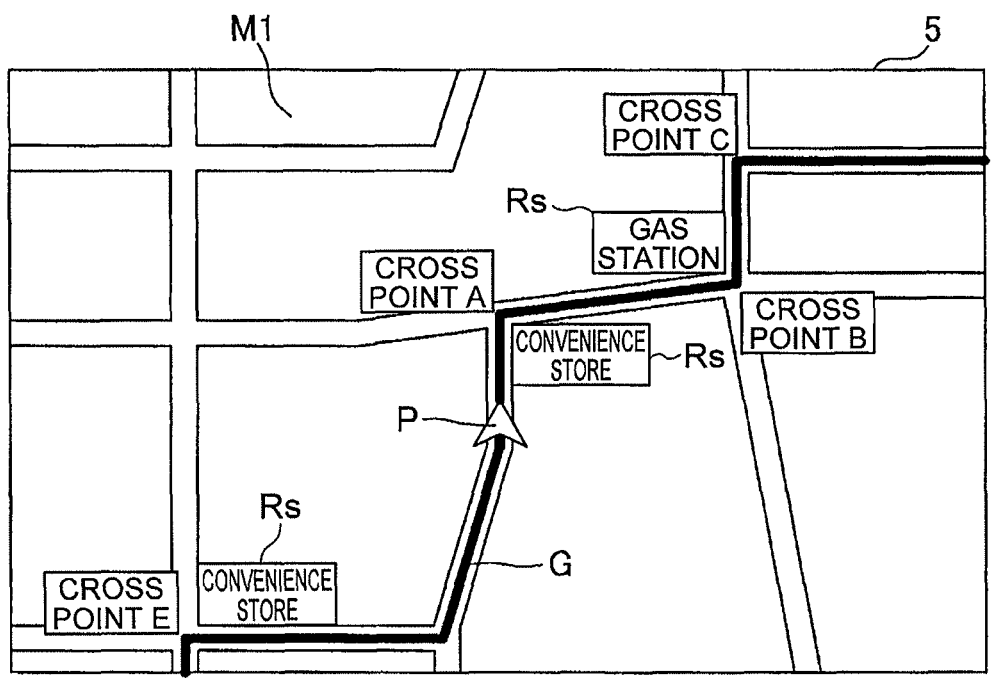
FIG. 5 is a diagram illustrating other exemplary information displayed on the liquid crystal display device illustrated in FIG. 1 (to display first scaled-up map information in medium scale).

When the driver then presses the touchpad 10 by a finger, the liquid crystal display device 5 displays thereon the first scaled-up map information M1 in larger scale than the standard map information M0 instead of the standard map information, the map-related information Rs within the display range of the first scaled-up map information M1, the vehicle pointer P and the guidance information G as illustrated in FIG. 5, and the display is kept while the driver is pressing the touchpad 10 by a finger.

Figure 4:
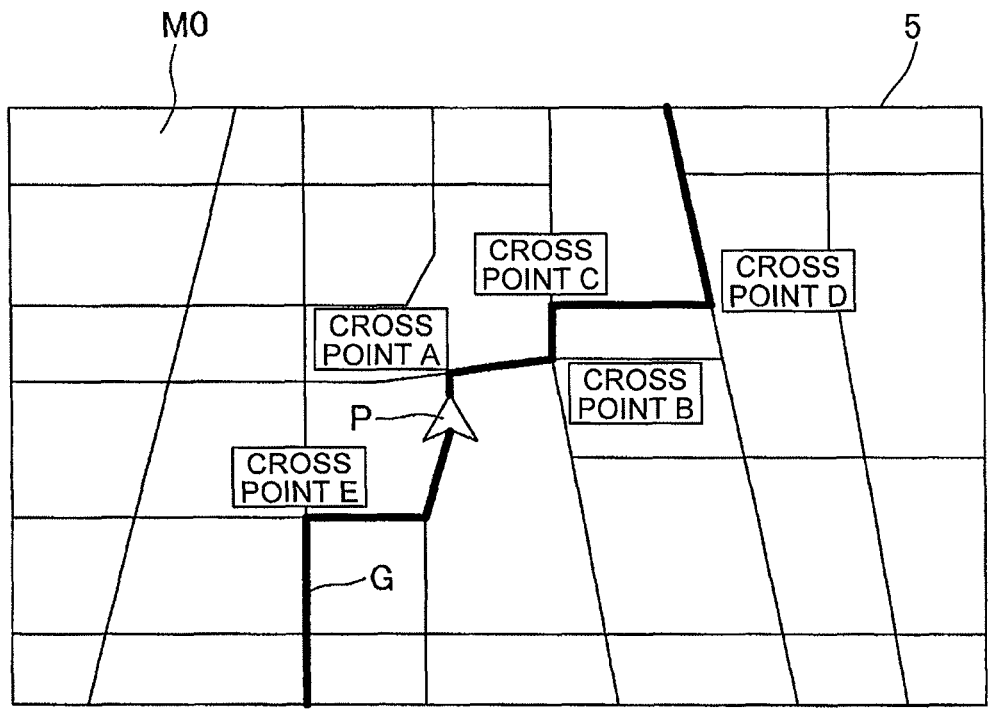
FIG. 4 is a diagram illustrating exemplary information displayed on a liquid crystal display device illustrated in FIG. 1 (to display standard map information in small scale).

Thereafter, when the driver releases the finger from the touchpad 10, the display of the liquid crystal display device 5 returns to the former display, where the standard map information M0, the vehicle pointer P and the guidance information G are displayed again as illustrated in FIG. 4.

In parallel with the above operations, the head-up display device 6 displays thereon status information on movement speed of the vehicle, or guidance information on distance and direction to a cross point to turn next based on other display control signal generated by the control unit 21.

In this way, in the navigation system according to the first embodiment, while the driver is releasing a finger from the touchpad 10, the standard map information M0 in small scale is displayed, and while the driver is pressing the touchpad 10 by a finger, the first scaled-up map information M1 as the scaled-up standard map information M0 and the map-related information Rs in the display range of the first scaled-up map information M1 are displayed.

As described above, according to the present embodiment, various items of information are displayed on the liquid crystal display device 5 and the head-up display device 6. When the user inputs an operation, the surface 10a of the touchpad 10 is contacted by the contact body such as a finger of the user. The control unit 21 in the navigation device 20 is the examples of the contact detection unit and the display control unit. The standard information display control unit and the extended information display control unit are the examples of the display control unit, and the examples of a first display control unit and a second display control unit described below. The display control unit includes the first display control unit for displaying information already displayed on the display unit and the second display control unit for displaying predetermined information on the display unit. The display control unit may not be necessarily provided with the first display control unit and the second display control unit, and a single display control unit may be employed. The contact detection unit detects a contact of the contact body on the surface 10a of the touchpad 10. The standard information display control unit displays the standard map information M0 in small scale on the liquid crystal display device 5, and displays the status information on movement speed of the vehicle, or the guidance information on distance and direction to a cross point to turn next on the head-up display device 6. Then, only while the contact detection unit is detecting that the contact body is contacting on the surface 10a of the touchpad 10, the extended information display control unit instead displays, on the liquid crystal display device 5, the first scaled-up map information M1 as the scaled-up standard map information M0 and the map-related information Rs in the display range of the first scaled-up map information M1. By doing so, when the user contacts the contact body such as a finger on the surface 10a of the touchpad 10 while the standard map information M0 in small scale continues to be displayed on the liquid crystal display device 5, the first scaled-up map information M1 and the map-related information Rs related thereto are displayed instead of the standard map information M0 while the contact on the surface 10a is kept, and then the contact body is released from (not contacted with) the surface 10a, thereby returning the display to the standard map information M0. Therefore, the operation of changing a display can be easily and accurately performed.

The touchpad 10 is configured to output an electric signal (or pressing force information) depending on a pressing force applied on the surface 10a, and the contact detection unit is configured to detect the presence or absence of a contact of the contact body based on the pressing force information output by the touchpad 10. By doing so, the presence or absence of a contact on the surface 10a is detected by a force with which the diver presses the contact body such as a finger against the surface 10a (pressing force), and thus the driver presses the contact body against the surface 10a with a relatively strong force. Thereby, an erroneous operation can be prevented and a feeling of operation can be given to the user, thereby easily and more accurately performing the operation of changing a display.

The liquid crystal display device 5 and the touchpad 10 are separately configured from each other. By doing so, the liquid crystal display device 5 can be arranged to be easily viewed by the driver, and the touchpad 10 can be arranged at a position where the driver can easily contact on the surface 10a by a finger, thereby more easily and accurately performing the operation of changing a display.

The navigation system 1 is mounted on the vehicle and the touchpad 10 thereof is arranged on the steering wheel 102 around the driver seat in the vehicle. By doing so, the driver can contact the surface 10a of the touchpad 10 by a finger without any trouble on the driving, thereby safely performing the operation of changing a display.

The present embodiment is such that the first scaled-up map information M1 as the scaled-up standard map information M0 and the map-related information Rs in the display range of the first scaled-up map information M1 are displayed instead of the standard map information M0 in small scale, but is not limited thereto. For example, there may be configured such that when the driver contacts on the surface 10a of the touchpad 10 by a finger or the like while the standard map information M0 continues to be displayed, the display area in the liquid crystal display device 5 is divided into the right and left areas, where the standard map information M0 is displayed in one area and the first scaled-up map information M1 and the map-related information Rs are displayed in the other area, or the standard map information M0 is added with the first scaled-up map information M1 and the map-related information Rs for display. Alternatively, there may be configured such that either one of the first scaled-up map information M1 and the map-related information Rs in the display range of the standard map information M0 is displayed instead of the standard map information M0 or in addition to the standard map information M0.

Second Embodiment

The navigation system as an electronic apparatus according to a second embodiment of the present invention will be described below.

In the navigation system according to the second embodiment, when nothing contacts on the surface 10a of the touchpad 10, the liquid crystal display device 5 displays thereon the standard map information M0 in small scale. Then, there is configured such that while a finger of the driver or the like is contacting on the surface 10a of the touchpad 10 and the surface 10a continues to be pressed, one item of scaled-up map information selected based on a pressing force out of first scaled-up map information M1 in medium scale and second scaled-up map information M2 in large scale previously defined depending on the force to press the surface 10a (pressing force) is displayed.

The navigation system according to the second embodiment has the same hardware structure as in the first embodiment, and is the same as the first embodiment except the differences in the operations of the control unit in the navigation device 20 and the displays of the liquid crystal display device 5 along with the operations, and thus the same components are denoted with the same reference numerals and the description thereof will be omitted.

Exemplary operations of the control unit 21 in the navigation device 20 provided in the navigation system according to the second embodiment will be described with reference to FIG. 7 and FIG. 8.

Figure 7:
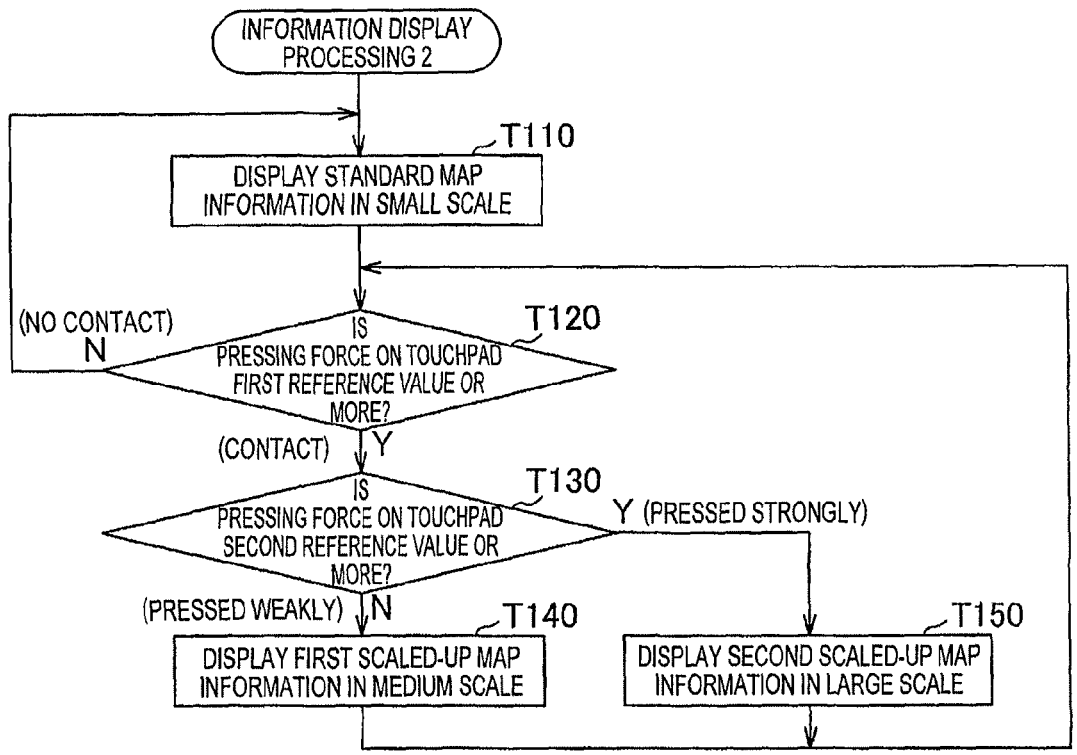
FIG. 7 is a flowchart illustrating an exemplary operation (information display processing 2) of the control unit in the navigation device provided in the navigation system according to a second embodiment of the present invention.

FIG. 7 is a flowchart illustrating an exemplary operation (information display processing 2) of the control unit in the navigation device provided in the navigation system according to the second embodiment of the present invention. FIG. 8 is a diagram illustrating exemplary information displayed on the liquid crystal display device in the navigation system according to the second embodiment (to display the second scaled-up map information in large scale). In the second embodiment, some displays are the same as in the first embodiment (FIG. 4 and FIG. 5), and thus the Figures will be also referred to.

At first, in step T110 illustrated in FIG. 7, the control unit 21 acquires current location information from the GPS reception unit 23, and generates and transmits a display control signal for displaying the standard map information M0 in predetermined small scale (such as 1/200,000th) indicating road shapes almost around a current location of the vehicle indicated in the current location information to the liquid crystal display device 5. Further, the display control signal includes the vehicle pointer P indicating a current location of the vehicle and the guidance information G indicating a route to a destination location in addition to the standard map information M0. When receiving the display control signal, the liquid crystal display device 5 displays the standard map information M0, the vehicle pointer P and the guidance information G on the display part as illustrated in FIG. 4. The processing then proceeds to step T120. The standard map information M0 corresponds to the examples of the information already displayed on the display unit and the map information.

In step T120, the control unit 21 determines whether the pressing force indicated by the electric signal (pressing force information) received from the touchpad 10 is a first reference value previously stored in the ROM or more. When the pressing force is less than the first reference value (N in step T120), the control unit 21 returns to step T110 assuming that nothing contacts on the touchpad 10, or when the pressing force is the first reference value or more (Y in T120), the control unit 21 proceeds to step T130 assuming that the contact body such as a finger of the driver contacts on the touchpad 10.

In step T130, the control unit 21 determines whether the pressing force indicated by the electric signal (pressing force information) received from the touchpad 10 is a second reference value previously stored in the ROM or more. When the pressing force is less than the second reference value (N in T130), the touchpad 10 is pressed with a relatively weak force and thus the control unit 21 proceeds to step T140 assuming that the first scaled-up map information M1 in predetermined medium scale (such as 1/50,000th) larger than the above small scale is selected, or when the pressing force is the second reference value or more (Y in T130), the touchpad 10 is pressed with a relatively strong force and thus the control unit 21 proceeds to step T150 assuming that the second scaled-up map information M2 in predetermined larger scale (such as 1/2,500th) larger than the above small scale and medium scale is selected. That is, the first scaled-up map information M1 and the second scaled-up map information M2 are the scaled-up standard map information M0.

In step T140, the control unit 21 acquires current location information from the GPS reception unit 23, and generates and transmits a display control signal for displaying the first scaled-up map information M1 to the liquid crystal display device 5. The display control signal includes the map-related information Rs such as icons indicating facilities including gas stations or convenience stores in the display range of the first scaled-up map information M1, the vehicle pointer P, and the guidance information G in addition to the first scaled-up map information M1. When receiving the display control signal, the liquid crystal display device 5 displays the first scaled-up map information M1, the map-related information Rs, the vehicle pointer P and the guidance information G on the display part as illustrated in FIG. 5. The processing then returns to step T120. The first scaled-up map information M1 corresponds to the examples of the predetermined information and the scaled-up map information. The map-related information Rs corresponds to the examples of the predetermined information and the map-related information.

In step T150, the control unit 21 acquires current location information from the GPS reception unit 23, and generates and transmits a display control signal for displaying the second scaled-up map information M2 to the liquid crystal display device 5. The display control signal includes the map-related information Rs such as icons indicating facilities including convenience stores within the display range of the second scaled-up map information M2, the vehicle pointer P, and the guidance information G in addition to the second scaled-up map information M2. When receiving the display control signal, the liquid crystal display device 5 displays the second scaled-up map information M2, the map-related information Rs, the vehicle pointer P and the guidance information G on the display part as illustrated in FIG. 8. The processing then returns to step T120. The second scaled-up map information M2 corresponds to the examples of the predetermined information and the scaled-up map information. The map-related information Rs corresponds to the examples of the predetermined information and the map-related information.

The control unit 21 performing the processing in step T110 corresponds to an exemplary standard information display control unit, the control unit 21 performing the processing in step T120 described above corresponds to an exemplary contact detection unit, and the control unit 21 performing a series of processings in steps T140 and T150 corresponds to an exemplary extended information display control unit.

Operations input in the navigation system according to the present embodiment and displays corresponding thereto will be described herein with reference to FIG. 4, FIG. 5, and FIG. 8 by way of example.

When the driver inputs a search operation in the liquid crystal display device 5, the navigation device 20 searches a route to a destination location. While the driver is gripping the steering wheel 102 and a finger of the driver continues to be released from the touchpad 10 provided on the steering wheel 102 (while nothing contacts on the touchpad 10), the liquid crystal display device 5 displays thereon the standard map information M0 in small scale indicating road shapes around a current location of the vehicle, the vehicle pointer P indicating a current location of the vehicle, and the guidance information G indicating a route to a destination location as illustrated in FIG. 4.

The driver then presses the touchpad 10 by a finger. At this time, if the driver presses the touchpad 10 with a relatively weak force, the liquid crystal display device 5 displays thereon the first scaled-up map information M1 in larger scale than the standard map information M0, and additionally displays the map-related information Rs in the display range of the first scaled-up map information M1, the vehicle pointer P and the guidance information G as illustrated in FIG. 5. The display is kept while the driver is pressing the touchpad 10 with a relatively weak force.

Figure 8:
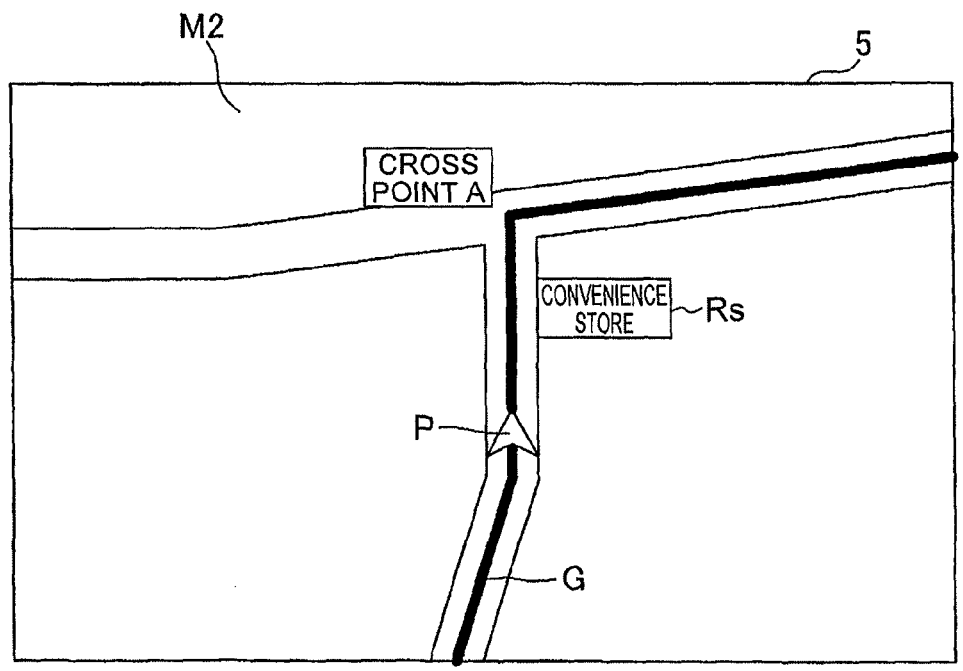
FIG. 8 is a diagram illustrating exemplary information displayed on the liquid crystal display device in the navigation system according to the second embodiment (to display second scaled-up map information in large scale).

When the driver presses the touchpad 10 with a relatively strong force, the liquid crystal display device 5 displays thereon the second scaled-up map information M2 in larger scale than the standard map information M0 and the first scaled-up map information M1, and additionally displays thereon the map-related information Rs in the display range of the second scaled-up map information M2, the vehicle pointer P and the guidance information G as illustrated in FIG. 8. The display is kept while the driver is pressing the touchpad 10 with a relatively strong force.

Thereafter, when the driver strengthens or weakens the pressing force on the touchpad 10, the display of the liquid crystal display device 5 is accordingly switched to the first scaled-up map information M1 or the second scaled-up map information M2, and when the driver releases the finger from the touchpad 10, the display of the liquid crystal display device 5 returns to the former display, where the standard map information M0, the vehicle pointer P and the guidance information G are displayed again as illustrated in FIG. 4.

In parallel with the above operations, the head-up display device 6 displays thereon, for example, the status information on movement speed of the vehicle or the guidance information on distance and direction to a cross point to turn next based on the display control signal generated by the control unit 21.

In this way, in the navigation system according to the second embodiment, while the driver is releasing a finger from the touchpad 10, the standard map information M0 in small scale continues to be displayed. While the driver is pressing the touchpad 10 with a relatively weak force, the first scaled-up map information M1 in medium scale and the map-related information Rs in the display range of the first scaled-up map information M1 are being displayed, and while the driver is pressing the touchpad 10 with a relatively strong force, the second scaled-up map information M2 in large scale and the map-related information Rs in the display range of the second scaled-up map information M2 are displayed.

As described above, according to the present embodiment, in addition to the advantages of the first embodiment, the touchpad 10 is configured to output an electric signal (or pressing force information) depending on a pressing force applied on the surface 10*a*, the contact detection unit is configured to detect the presence or absence of a contact of the contact body based on the pressing force information output by the touchpad 10, and the extended information display control unit is configured to display one item of scaled-up map information selected based on the pressing force information output by the touchpad 10 out of the first scaled-up map information M1 and the second scaled-up map information M2 in predefined scales (or scale-up rates) depending on the pressing force applied on the surface 10*a* of the touchpad 10. By doing so, the driver strengthens or weakens a force to press the contact body such as a finger against the surface 10*a* of the touchpad 10, thereby displaying the first scaled-up map information M1 or the second scaled-up map information M2 in different scale depending on the strengthened or weakened force and more easily and accurately performing the operation of changing a display.

The present embodiment is such that the first scaled-up map information M1 in medium scale and the second scaled-up map information M2 in large scale are displayed in two-stage scale-up depending on a pressing force applied to the surface 10*a* of the touchpad 10, but is not limited thereto, and scale-up display in three or more stages may be performed depending on the pressing force.

Third Embodiment

The navigation system as an electronic apparatus according to a third embodiment of the present invention will be described below.

In the navigation system according to the third embodiment, when nothing contacts on the surface 10*a* of the touchpad 10, the head-up display device 6 displays thereon the status information on movement speed of the vehicle, and the guidance information on distance and direction to a cross point to turn next. There is configured such that while a finger of the driver or the like is contacting on the surface 10*a* of the touchpad 10 and the surface 10*a* continues to be pressed, one item of map-related information selected based on a pressing force out of first map-related information R1 on the vicinities of locations at a predefined first distance and second map-related information R2 on the vicinities of locations at a second distance longer than the first distance previously defined depending on the force to press the surface 10*a* (pressing force) is displayed.

The navigation system according to the third embodiment has the same hardware structure as in the first embodiment, and is the same as in the first embodiment except the differences in the operations of the control unit in the navigation device 20 and the displays of the head-up display device 6 along with the operations, and thus the same components are denoted with the same reference numerals and the description thereof will be omitted.

Exemplary operations of the control unit 21 in the navigation device 20 provided in the navigation system according to the third embodiment will be described with reference to FIG. 9 to FIG. 12.

Figure 9:
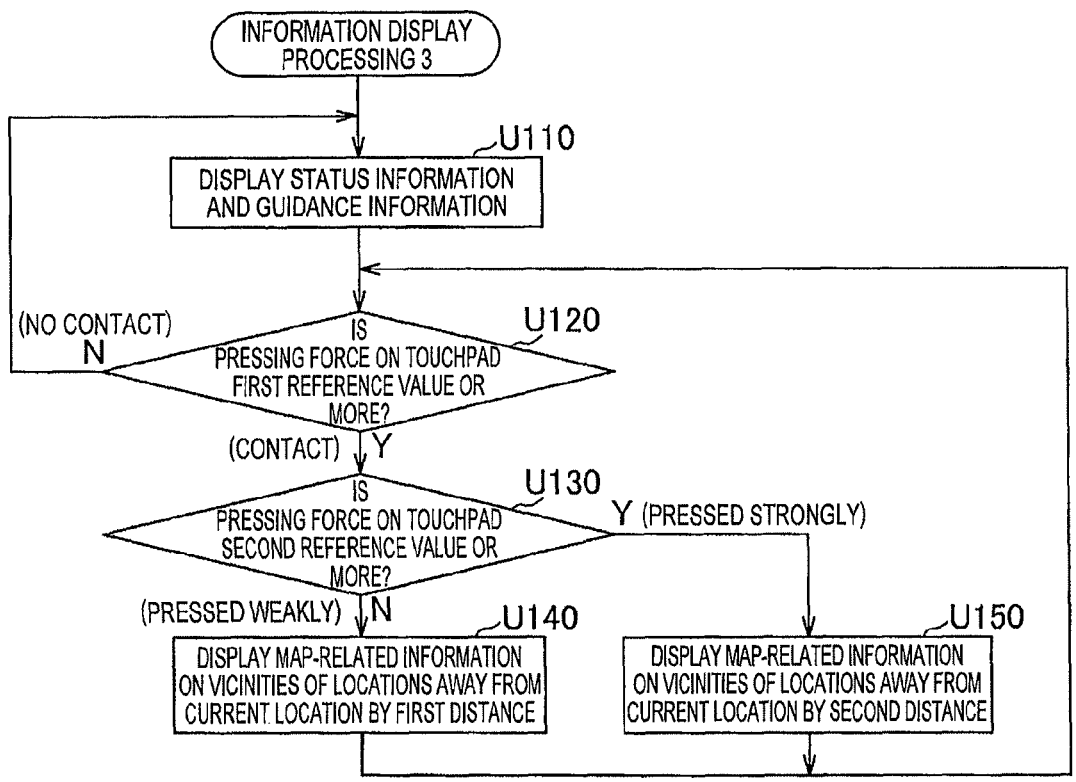
FIG. 9 is a flowchart illustrating an exemplary operation (information display processing 3) of the control unit in the navigation device provided in the navigation system according to a third embodiment of the present invention.
Figure 10:
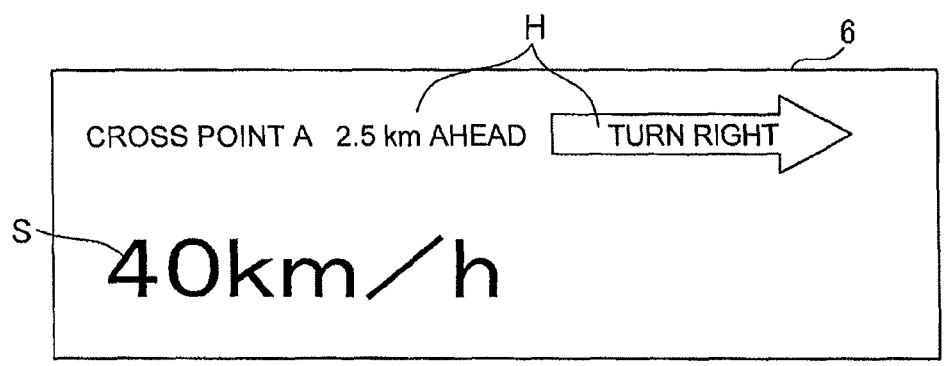
FIG. 10 is a diagram illustrating exemplary information displayed on a head-up display device in the navigation system according to the third embodiment (to display status information and guidance information).
Figure 11:
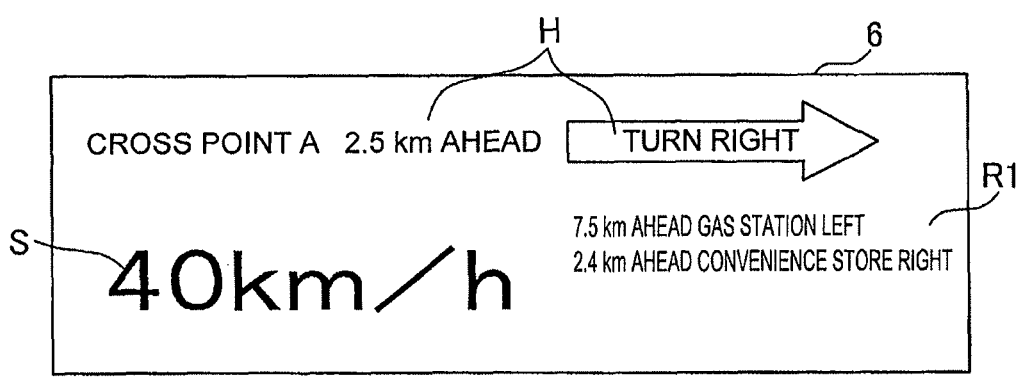
FIG. 11 is a diagram illustrating other exemplary information displayed on the head-up display device in the navigation system according to the third embodiment (to display status information, guidance information, and map-related information on the vicinities of locations away from a current location by a first distance).
Figure 12:
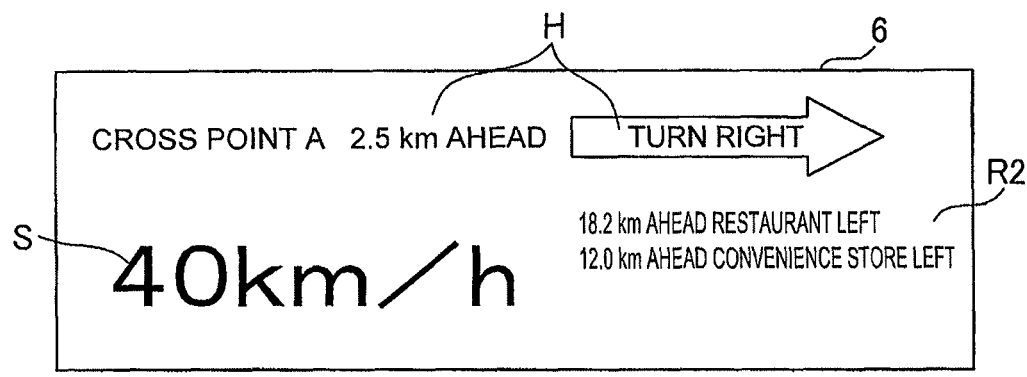
FIG. 12 is a diagram illustrating other exemplary information displayed on the head-up display device in the navigation system according to the third embodiment (to display status information, guidance information, and map-related information on the vicinities of locations away from a current location by a second distance).

FIG. 9 is a flowchart illustrating an exemplary operation (information display processing 3) of the control unit in the navigation device provided in the navigation system according to the third embodiment of the present invention. FIG. 10 is a diagram illustrating exemplary information displayed on the head-up display device in the navigation system according to the third embodiment (to display status information and guidance information). FIG. 11 is a diagram illustrating other exemplary information displayed on the head-up display device in the navigation system according to the third embodiment (to display status information, guidance information, and first map-related information on the vicinities of locations away from a current location by a first distance). FIG. 12 is a diagram illustrating other exemplary information displayed on the head-up display device in the navigation system according to the third embodiment (to display status information, guidance information, and second map-related information on the vicinities of locations away from a current location by a second distance). In FIG. 10 to FIG. 12, the scene beyond the front glass 103, which is viewed with overlap on various items of information, is omitted in its illustration.

At first, in step U110 illustrated in FIG. 9, the control unit 21 acquires status information S such as movement speed of the vehicle from a vehicle speed sensor via the sensor input unit 24, and acquires guidance information H on distance and direction to a cross point to turn next based on a result of route search. The control unit 21 then generates and transmits a display control signal for displaying the status information S and the guidance information H to the head-up display device 6. When receiving the display control signal, the head-up display device 6 displays thereon the status information S and the guidance information H as illustrated in FIG. 10. The processing then proceeds to step U120. The present embodiment is such that the status information S is a movement speed of the vehicle by way of example, but is not limited thereto, and for example, any kind of status information S is possible if predetermined status information can be provided to the user, such as statuses of the vehicle (such as movement speed, engine revolution, remaining fuel amount, water temperature, room temperature and travelling distance) or environmental statuses of the vehicle (such as temperature, humidity and weather). The status information S and the guidance information H correspond to the examples of the information already displayed on the display unit as well as the status information and the guidance information.

In step U120, the control unit 21 determines whether the pressing force indicated in the electric signal (pressing force information) received from the touchpad 10 is a first reference value previously stored in the ROM or more. When the pressing force is less than the first reference value (N in U120), the control unit 21 returns to step U110 assuming that nothing contacts on the touchpad 10, or when the pressing force is the first reference value or more (Y in U120), the control unit 21 proceeds to step U130 assuming that the contact body such as a finger of the driver contacts on the touchpad 10.

In step U130, the control unit 21 determines whether the pressing force indicated by the electric signal (pressing force information) received from the touchpad 10 is a second reference value previously stored in the ROM or more. When the pressing force is less than the second reference value (N in U130), the touchpad 10 continues to be pressed with a relatively weak force and thus the control unit 21 proceeds to step U140 assuming that the first map-related information R1 on the vicinities of locations away from a current location by a first distance (such as 5 km ahead) is selected, or when the pressing force is the second reference value or more (Y in U130), the touchpad 10 continues to be pressed with a relatively strong force and thus the control unit 21 proceeds to step U150 assuming that the second map-related information R2 on the vicinities of locations away from a current location by a second distance (such as 15 km ahead) longer than the first distance is selected.

In step U140, the control unit 21 generates and transmits a display control signal for displaying the first map-related information R1 on facilities including gas stations or convenience stores in the vicinities of locations from a current location by a first distance (for example, within 5 km around a 5 km-ahead location, or between a current location and 10 km-ahead locations) together with the status information S and the guidance information H to the head-up display device 6. When receiving the display control signal, the head-up display device 6 displays thereon the first map-related information R1 in addition to the status information S and the guidance information H as illustrated in FIG. 11. The processing then returns to step U120. The first map-related information R1 corresponds to the examples of the predetermined information and the map-related information.

In step U150, the control unit 21 generates and transmits a display control signal for displaying the second map-related information R2 on facilities including gas stations or convenience stores in the vicinities of locations away from a current location by a second distance (such as within 5 km around a 15 km-ahead location, or between 10 km-ahead locations and 20 km-ahead locations) together with the status information S and the guidance information H to the head-up display device 6. When receiving the display control signal, the head-up display device 6 displays thereon the second map-related information R2 in addition to the status information S and the guidance information H as illustrated in FIG. 12. The processing then returns to step U120. The second map-related information R2 corresponds to the examples of the predetermined information and the map-related information.

The control unit 21 performing the processing in step U110 corresponds to an exemplary standard information display control unit, the control unit 21 performing the processing in step U120 corresponds to an exemplary contact detection unit, and the control unit 21 performing a series of processings in steps U140 and U150 corresponds to an exemplary extended information display control unit.

Operations input in the navigation system according to the present embodiment and displays corresponding thereto will be described herein with reference to FIG. 10 to FIG. 12 by way of example.

When the driver inputs a search operation in the liquid crystal display device 5, the navigation device 20 searches a route to a destination location. While the driver is gripping the steering wheel 102 and a finger of the driver continues to be released from the touchpad 10 provided on the steering wheel 102 (while nothing contacts on the touchpad 10), the head-up display device 6 displays thereon the status information S on movement speed of the vehicle, and the guidance information H on distance and turn direction to a cross point to turn next, as illustrated in FIG. 10.

The driver then presses the touchpad 10 by a finger. At this time, if the driver presses the touchpad 10 with a relatively weak force, the head-up display device 6 displays thereon the first map-related information R1 on the vicinities of locations away from a current location by a first distance together with the status information S and the guidance information H as illustrated in FIG. 11. The display is kept while the driver is pressing the touchpad 10 with a relatively weak force.

When the driver presses the touchpad 10 with a relatively strong force, the head-up display device 6 displays thereon the second map-related information R2 on the vicinities of locations from a current location by a second distance longer than the first distance together with the status information S and the guidance information H as illustrated in FIG. 12. The display is kept while the driver is pressing the touchpad 10 with a relatively strong force.

Thereafter, when the driver strengthens or weakens the pressing force on the touchpad 10, the display of the head-up display device 6 is accordingly switched to the first map-related information R1 or the second map-related information R2, and when the driver releases the finger from the touchpad 10, the display of the head-up display device 6 returns to the former display, where only the status information S and the guidance information H are displayed as illustrated in FIG. 10.

In parallel with the above operations, the liquid crystal display device 5 displays thereon the map information on the vicinity of a current location of the vehicle, and the map-related information within the display range of the map information based on the display control signal generated by the control unit 21.

In this way, in the navigation system according to the third embodiment, while the driver is releasing a finger from the touchpad 10, only the status information S and the guidance information H are displayed. While the driver is pressing the touchpad 10 with a relatively weak force, the first map-related information R1 on the vicinities of locations away from a current location by a first distance continues to be displayed together with the status information S and the guidance information H, and while the driver is pressing the touchpad 10 with a relatively strong force, the second map-related information R2 on the vicinities of locations away from a current location by a second distance longer than the first distance continues to be displayed together with the status information S and the guidance information H.

As described above, according to the present embodiment, various items of information are displayed on the liquid crystal display device 5 and the head-up display device 6. When the user inputs an operation, the surface 10a of the touchpad 10 is contacted by the contact body such as a finger of the user. The control unit 21 in the navigation device 20 is the examples of the contact detection unit, the standard information display control unit and the extended information display control unit. The contact detection unit detects a contact of the contact body on the surface 10a of the touchpad 10. The standard information display control unit displays the map information on the vicinity of a current location of the vehicle on the liquid crystal display device 5, and displays the status information S on movement speed of the vehicle and the guidance information H on distance and direction to a cross point to turn next on the head-up display device 6. Then, only while the contact detection unit is detecting a contact of the contact body on the surface 10a of the touchpad 10, the extended information display control unit displays the first map-related information R1 on the vicinities of locations away from a current location by a first distance and the second map-related information R2 on the vicinities of locations at a second distance longer than the first distance in addition to the status information S and the guidance information H on the head-up display device 6. By doing so, when the user contacts the contact body such as a finger on the surface 10a of the touchpad 10 while only the status information S and the guidance information H are being displayed on the head-up display device 6, the first map-related information R1 or the second map-related information R2 is displayed in addition to the status information S and the guidance information H while the contact on the surface 10a is kept, and then the display can be returned to only the status information S and the guidance information H when the contact body is released from (not contacted with) the surface 10a. Therefore, the operation of changing a display can be easily and accurately performed.

The touchpad 10 is configured to output an electric signal (or pressing force information) depending on a pressing force applied on the surface 10a, and the contact detection unit is configured to detect the presence or absence of a contact of the contact body based on the pressing force information output by the touchpad 10. By doing so, the presence or absence of a contact on the surface 10a is detected by a force with which the driver presses the contact body such as a finger against the surface 10a (pressing force), and thus the driver presses the contact body against the surface 10a with a relatively strong force. Thereby, an erroneous operation can be prevented and a feeling of operation can be given to the user, thereby easily and more accurately performing the operation of changing a display.

The touchpad 10 is configured to output an electric signal (or pressing force information) depending on a pressing force applied on the surface 10a, the contact detection unit is configured to detect the presence or absence of a contact of the contact body based on the pressing force information output by the touchpad 10, and the extended information display control unit is configured to display one item of map-related information selected based on the pressing force information output by the touchpad 10 out of the first map-related information R1 on the vicinities of locations at a first distance and the second map-related information R2 on the vicinities of locations at a second distance previously defined depending on the pressing force applied on the surface 10a of the touchpad 10. By doing so, the driver strengthens or weakens the pressing force of the contact body such as a finger against the surface 10a of the touchpad 10 to display the first map-related information R1 or the second map-related information R2 on the vicinities of locations at a different distance depending on the strengthened or weakened force, thereby more easily and accurately performing the operation of changing a display.

The liquid crystal display device 5 and the touchpad 10 are separately configured from each other. By doing so, the liquid crystal display device 5 can be arranged to be easily viewed by the driver, and the touchpad 10 can be arranged at a position where the driver can easily contact on the surface 10a by a finger, thereby more easily and accurately performing the operation of changing a display.

The navigation system 1 is mounted on the vehicle and the touchpad 10 thereof is arranged on the steering wheel 102 around the driver seat in the vehicle. By doing so, the driver can contact a finger or the like on the surface 10a of the touchpad 10 without any trouble on the driving, thereby safely performing the operation of changing a display.

The present embodiment is such that when nothing contacts on the surface 10a of the touchpad 10, only the status information S and the guidance information H are displayed, and when the surface 10a is contacted, the first map-related information R1 or the second map-related information R2 is displayed, but is not limited thereto. For example, when nothing contacts on the surface 10a of the touchpad 10, only one of the status information S and the guidance information H may be displayed. Alternatively, there may be configured such that when nothing contacts on the surface 10a of the touchpad 10, the first map-related information R1 is displayed in addition to the status information S and the guidance information H (FIG. 11), and when the surface 10a is contacted, the second map-related information R2 is displayed in addition to the status information S and the guidance information H. In this case, the status information S, the guidance information H and the first map-related information R1 correspond to the examples of the information already displayed on the display unit, and the second map-related information R2 corresponds to an example of the predetermined information. That is, there may be configured such that when nothing contacts on the surface 10a of the touchpad 10, at least one item of information selected from a group consisting of the map-related information on the vicinity of a current location, the map information on the vicinity of a current location, the guidance information to a destination location and the predetermined status information is displayed.

The present embodiment is such that the first map-related information R1 and the second map-related information R2 are switched to be displayed depending on the strengthened or weakened pressing force on the surface 10a of the touchpad 10, but is not limited thereto, and for example, there may be configured such that while the touchpad 10 continues to be pressed with a relatively weak force, the first map-related information R1 is displayed, and when the touchpad 10 continues to be pressed with a relatively strong force, the second map-related information R1 is displayed in addition to the first map-related information R1.

Fourth Embodiment

The navigation system as an electronic apparatus according to a fourth embodiment of the present invention will be described below.

The navigation system according to the fourth embodiment is a combination of the second embodiment and the third embodiment.

That is, when nothing contacts on the surface 10a of the touchpad 10, the standard map information M0 in small scale is displayed on the liquid crystal display device 5. There is configured such that while a finger of the driver or the like is contacting on the surface 10a of the touchpad 10 and the surface 10a continues to be pressed, one item of scaled-up map information selected based on a pressing force out of the first scaled-up map information M1 in medium scale and the second scaled-up map information M2 in large scale previously defined depending on the force to press the surface 10a (pressing force) is displayed.

In parallel with the above operations, when nothing contacts on the surface 10a of the touchpad 10, the head-up display device 6 displays thereon the status information on movement speed of the vehicle, and the guidance information on distance and direction to a cross point to turn next. There is configured such that while a finger of the driver or the like is contacting on the surface 10a of the touchpad 10 and the surface 10a continues to be pressed, one items of map-related information selected based on a pressing force out of the first map-related information R1 on the vicinities of locations at a first distance and the second map-related information R2 on the vicinities of locations at a second distance longer than the first distance previously defined depending on the force to press the surface 10a (pressing force) is displayed.

The navigation system according to the fourth embodiment has the same hardware structure as in the first embodiment, and is the same as in the first embodiment except the differences in the operations of the control unit in the navigation device 20 and the displays of the liquid crystal display device 5 and the head-up display device 6 along with the operations, and thus the same components are denoted with the same reference numerals and the description thereof will be omitted.

The control unit 21 in the navigation device 20 provided in the navigation system according to the fourth embodiment performs the operations illustrated in the flowchart of FIG. 7 and the flowchart of FIG. 9 in parallel by way of example.

Operations input in the navigation system according to the present embodiment and displays corresponding thereto will be described with reference to FIG. 4, FIG. 5, FIG. 8, and FIG. 10 to FIG. 12 by way of example.

When the driver inputs a search operation in the liquid crystal display device 5, the navigation device 20 searches a route to a destination location. While the driver is gripping the steering wheel 102 and a finger of the driver continues to be released from the touchpad 10 provided on the steering wheel 102 (while nothing contacts on the touchpad 10), the liquid crystal display device 5 displays thereon the standard map information M0 in small scale indicating road shapes in the vicinity of a current location of the vehicle, the vehicle pointer P indicating a current location of the vehicle, and the guidance information G indicating a route to a destination location as illustrated in FIG. 4. Further, in parallel with this, the head-up display device 6 displays thereon the status information S on movement speed of the vehicle and the guidance information H on distance and turn direction to a cross point to turn next as illustrated in FIG. 10.

The driver then presses the touchpad 10 by a finger. At this time, if the driver presses the touchpad 10 with a relatively weak force, the liquid crystal display device 5 displays thereon the first scaled-up map information M1 in larger scale than the standard map information M0, and the map-related information Rs in the display range of the first scaled-up map information M1, the vehicle pointer P, and the guidance information G as illustrated in FIG. 5. The display is kept while the driver is pressing the touchpad 10 with a relatively weak force. Further, in parallel with this, as illustrated in FIG. 11, the head-up display device 6 displays thereon the first map-related information R1 on the vicinities of locations away from a current location by a first distance together with the status information S and the guidance information H. The display is kept while the driver is pressing the touchpad 10 with a relatively weak force.

When the driver presses the touchpad 10 with a relatively strong force, the liquid crystal display device 5 displays thereon the standard map information M0 and the second scaled-up map information M2 in larger scale than the first scaled-up map information M1, and additionally displays thereon the map-related information Rs in the display range of the second scaled-up map information M2, the vehicle pointer P, and the guidance information G as illustrated in FIG. 8. The display is kept while the driver is pressing the touchpad 10 with a relatively strong force. Further, in parallel with this, the head-up display device 6 displays thereon the second map-related information R2 on the vicinities of locations away from a current location by a second distance longer than the first distance together with the status information S and the guidance information H as illustrated in FIG. 12. The display is kept while the driver is pressing the touchpad 10 with a relatively strong force.

Thereafter, when the driver strengthens or weakens the pressing force on the touchpad 10, the display of the liquid crystal display device 5 is accordingly switched to the first scaled-up map information M1 or the second scaled-up map information M2, and when the driver releases the finger from the touchpad 10, the display of the liquid crystal display device 5 returns to the former display, where the standard map information M0, the vehicle pointer P, and the guidance information G are displayed again as illustrated in FIG. 4. Similarly, when the driver strengthens or weakens the pressing force on the touchpad 10, the display of the head-up display device 6 is accordingly switched to the first map-related information R1 or the second map-related information R2, and when the driver releases the finger from the touchpad 10, the display of the head-up display device 6 returns to the former display, where only the status information S and the guidance information H are displayed as illustrated in FIG. 10.

As described above, the present embodiment performs the operations in combination of the second embodiment and the third embodiment, and thus obtains the same advantages as those of the second embodiment and the third embodiment.

The present invention has been described above by way of the preferred embodiments, but the electronic apparatus according to the present invention is not limited to the structures of the above embodiments.

For example, each embodiment described above is such that the touchpad 10 using a pressure sensitive sensor is provided as an operation input unit, but is not limited thereto. For example, a resistive touch panel may be employed instead of the pressure sensitive sensor. Further, in a structure in which only a contact is detected and a pressing force is not detected, a capacitance type touch panel may be employed.

Figure 13A:
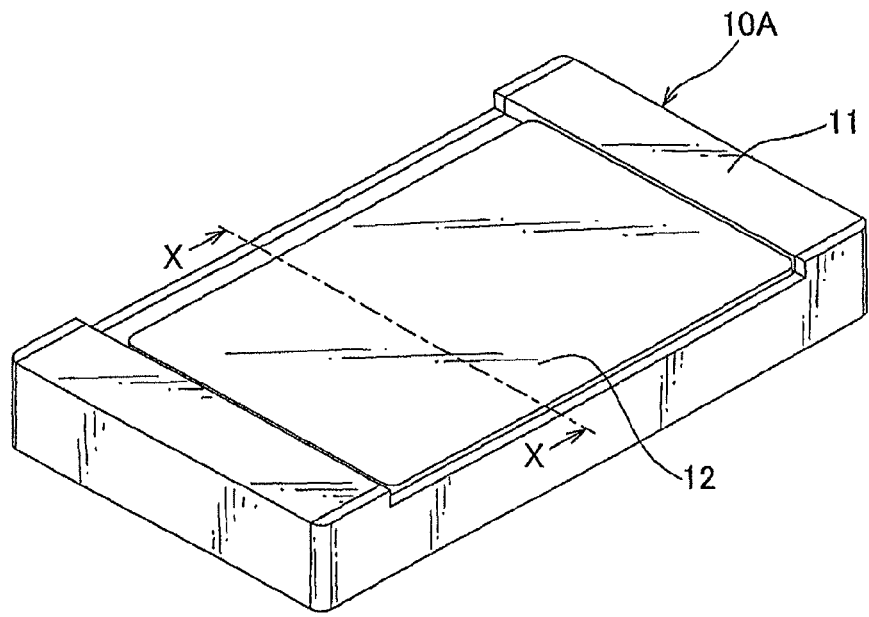
FIG. 13A is a perspective view illustrating an exemplary operation input unit.
Figure 13B:
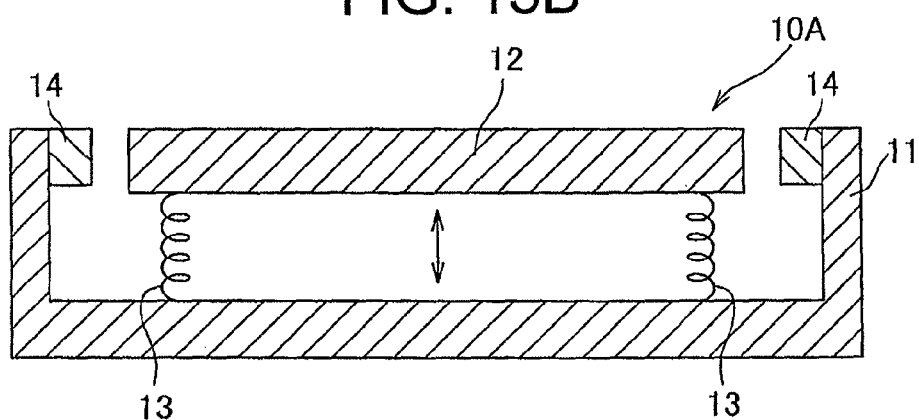
FIG. 13B is a cross-section view along the line x-x of FIG. 13A.
Figure 13C:
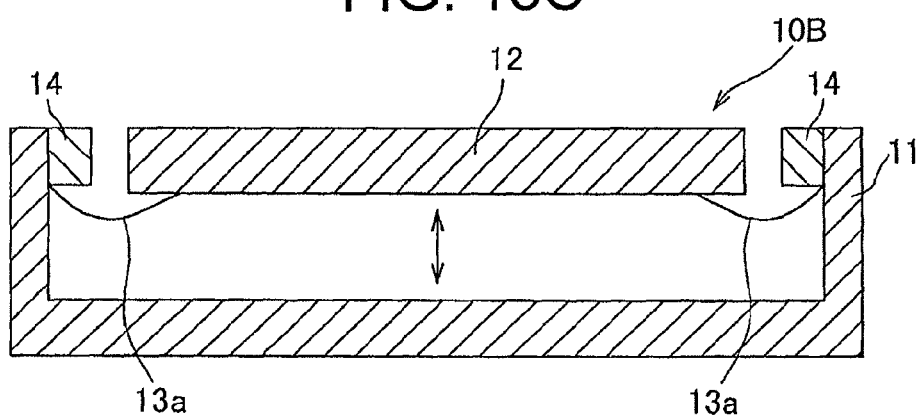
FIG. 13C is a cross-section view of a variant of the operation input unit of FIG. 13A.

Alternatively, an operation input unit 10A illustrated in FIGS. 13A and 13B may be employed instead of the touchpad 10. FIG. 13A is a perspective view illustrating an exemplary operation input unit, and FIG. 13B is a cross-section view along the line x-x of FIG. 13A. The operation input unit 10A includes a box-shaped case 11 with the top surface in the Figure opened, an operation board part 12 arranged to close the opening of the case 11 and to be vertically movable in the Figure within the case 11, a spring member 13 for supporting the operation board part 12 to be faced upward in the Figure, and a sensor unit 14 for outputting an electric signal depending on the amount of vertical motion (the amount of displacement) of the operation board part 12. By use of the operation input unit 10A, the operation board part 12 displaces and sinks depending on a pressing force, and thus the user feels a reaction to the operation (displacement of the operation board part 12). Thereby, an erroneous operation can be prevented and a feeling of operation can be given to the user, thereby easily and more accurately performing the operation of changing a display. In this case, the operation input unit 10A corresponds to an exemplary operation input unit, the operation board part 12 corresponds to an exemplary contact surface, and an electric signal output from the sensor unit 14 corresponds to exemplary pressing force information. The operation unit 10A is configured to support the operation board part 12 by the spring member 13, but an operation input unit 10B may be configured to support the operation board part 12 by an edge (or damper) 13a formed with an elastic material such as woven fabric, rubber material or polyurethane instead of the spring member 13 as illustrated in FIG. 13C.

Figure 14:
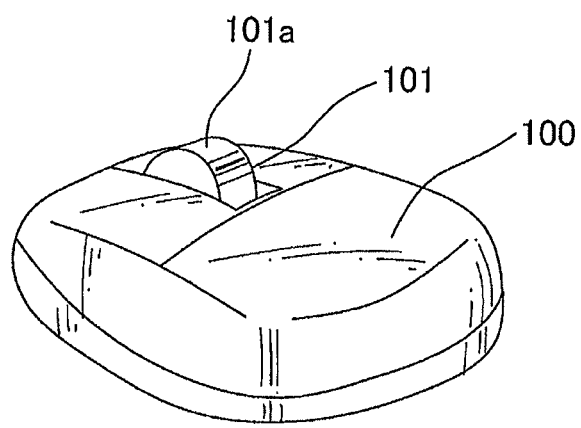
FIG. 14 is a perspective view of a mouse as an exemplary operation input unit.

Alternatively, a PC mouse 100 including a wheel 101 as illustrated in FIG. 14 may be employed, for example, instead of the touchpad 10. Specifically, the mouse 100 outputs an electric signal indicating that the wheel 101 is pressed down, and thus the presence or absence of a contact on the wheel 101 may be detected based on the electric signal. In this case, the mouse 100 corresponds to an exemplary operation input unit and a wheel periphery 101a corresponds to an exemplary contact surface.

Each embodiment described above is such that various items of information are displayed by use of the liquid crystal display device 5 and the head-up display device 6 as display units, but is not limited thereto. Instead, for example, there may be configured such that the display unit employs a display device provided in a combination meter of the vehicle, a passenger seat display device arranged in front of the passenger seat on the dashboard in the vehicle, a rear passenger seat display device arranged on the back of the passenger seat in the vehicle, a display device mounted on another vehicle close to the vehicle, a notebook type personal computer or Smartphone mounted on the vehicle, or the like as a display unit. In particular, there may be configured such that the display parts of a notebook type personal computer and a Smartphone are used as display units and the keyboard and touch panel thereof are used as operation input units.

Each embodiment described above is such that the touchpad 10 is arranged on the steering wheel 102, but is not limited thereto, and for example, the touchpad 10 may be arranged on an armrest part 104 (FIG. 1) on the driver seat door in the vehicle or a center console 105 between the driver seat and the passenger seat (FIG. 1), and is preferably arranged around the driver seat in the vehicle without departing from the spirit of the present invention. By doing so, the driver as a user can contact the contact body such as a finger on the surface 10a of the touchpad 10 without any trouble on the driving, thereby safely performing the operation of changing a display.

Each embodiment described above is such that the liquid crystal display device 5 and the head-up display device 6 are separately configured from the touchpad 10, but is not limited thereto, and for example, the liquid crystal display device 5, the touchpad 10, and the navigation device 20 may be integrated thereby to configure the navigation system.

Each embodiment has been described above by way of an example of a navigation system mounted on a vehicle, but is not limited thereto, and for example, a navigation system for walking or bicycle, or an electronic apparatus such as home appliance installed indoors may be employed.

The above embodiments are merely representative forms of the present invention, and the present invention is not limited to the embodiments. That is, those skilled in the art can make various modifications without departing from the spirit of the present invention according to well-known knowledge. Any structures of electronic apparatuses according to the present invention even in such modifications are encompassed in the scope of the present invention.

REFERENCE SIGNS LIST

1: Navigation system (example of electronic apparatus)
5: Liquid crystal display device (example of display unit)
6: Head-up display device (example of display unit)
10: Touchpad (example of operation input unit)

10a: Touchpad surface (example of contact surface)
10A, 10B: Operation input unit (example of operation input unit)
12: Operation board part (example of contact surface)
20: Navigation device
21: Control unit (examples of contact detection unit and display control unit)
G, H: Guidance information (example of information already displayed on display unit)
S: Status information (example of information already displayed on display unit)
M0: Standard map information (examples of information already displayed on display unit and map information)
M1: First scaled-up map information (examples of predetermined information and scaled-up map information)
M2: Second scaled-up map information (examples of predetermined information and scaled-up map information)
R1: First map-related information (examples of predetermined information and map-related information)
R2: Second map-related information (examples of predetermined information and map-related information)
Rs: Map-related information (examples of predetermined information and map-related information)

The invention claimed is:

1. An electronic apparatus comprising:
   an operation input unit arranged around a driver seat and including a contact surface;
   a display unit configured separately from the operation input unit;
   at least one memory operable to store computer program instructions; and
   at least one processor operable to access the at least one memory, read the program instructions, and operate according to the program instructions, the program instructions including control instructions configured to cause at least one of the at least one processor to:
   detect whether a contact body contacts the contact surface or not;
   display map-related information on buildings or facilities away from a current location by a predetermined distance different from already displayed information on the display unit only while a contact on the contact surface by the contact body is detected; and
   hide the map-related information already displayed on the display unit when the contact on the contact surface by the contact body is released from the contact surface;
   detect a pressing force applied on the contact surface; and
   display the map-related information on a location from the current location at a different distance depending on the pressing strengthened or weakened force on the display unit.

2. The electronic apparatus as claimed in claim 1, wherein the control instructions are further configured to cause at least one of the at least one processor to, as the pressing force becomes stronger, display the map-related information on the location further away from the current location.

3. The electronic apparatus as claimed in claim 1, wherein the operation input unit is provided on a steering wheel.

4. The electronic apparatus as claimed in claim 2, wherein the operation input unit is provided on a steering wheel.

5. The electronic apparatus as claimed in claim 1, wherein the operation input unit is arranged on a center console.

6. The electronic apparatus as claimed in claim 2, wherein the operation input unit is arranged on a center console.

7. The electronic apparatus as claimed in claim 1, wherein the map-related information is a first map-related information at a first distance away from the current location, and
   the control instructions are further configured to cause at least one of the at least one processor to, when the contact surface of the operation input unit is pressed with the stronger pressing force than the pressing force for displaying the first map-related information, display a second map-related information at a second distance further away from the current location than the first distance.

* * * * *